US008550195B1

(12) United States Patent
 Larke

(10) Patent No.: US 8,550,195 B1
(45) Date of Patent: Oct. 8, 2013

(54) ELECTRIC VEHICLE

(71) Applicant: Harold Ray Larke, Crystal Lake, IL (US)

(72) Inventor: Harold Ray Larke, Crystal Lake, IL (US)

( * ) Notice: Subject to any disclaimer, the term of this patent is extended or adjusted under 35 U.S.C. 154(b) by 0 days.

(21) Appl. No.: 13/708,352

(22) Filed: Dec. 7, 2012

Related U.S. Application Data

(63) Continuation of application No. 12/268,185, filed on Nov. 10, 2008, now Pat. No. 8,387,728.

(51) Int. Cl.
 *B60K 1/00* (2006.01)
(52) U.S. Cl.
 USPC ...................................... 180/65.1; 180/65.31
(58) Field of Classification Search
 USPC ........ 180/65.1, 65.21, 65.22, 65.225, 65.235, 180/65.24, 65.245, 65.31, 65.7, 337
 See application file for complete search history.

(56) References Cited

U.S. PATENT DOCUMENTS

| 2,800,595 | A | * | 7/1957 | Fairweather et al. | 307/57 |
|---|---|---|---|---|---|
| 5,081,365 | A | * | 1/1992 | Field et al. | 290/45 |
| 5,214,358 | A | * | 5/1993 | Marshall | 318/139 |
| 5,311,063 | A | * | 5/1994 | Hubler | 290/40 C |
| 7,395,889 | B2 | * | 7/2008 | Sugiyama et al. | 180/65.285 |
| 7,740,092 | B2 | * | 6/2010 | Bender | 180/65.29 |
| 7,921,945 | B2 | * | 4/2011 | Harris | 180/65.285 |
| 2002/0132696 | A1 | * | 9/2002 | Pannell | 477/5 |
| 2003/0098185 | A1 | * | 5/2003 | Komeda et al. | 180/65.2 |
| 2006/0180361 | A1 | * | 8/2006 | Montalbo | 180/65.1 |
| 2007/0241611 | A1 | * | 10/2007 | Shimada et al. | 303/152 |
| 2008/0039281 | A1 | * | 2/2008 | Okuda et al. | 477/73 |
| 2009/0095549 | A1 | * | 4/2009 | Dalum et al. | 180/65.265 |

* cited by examiner

*Primary Examiner* — J. Allen Shriver, II
*Assistant Examiner* — Bridget Avery
(74) *Attorney, Agent, or Firm* — Matthew R. P. Perrone, Jr.

(57) ABSTRACT

An electric vehicle having good range and power is achieved by providing a vehicle having a motor side assembly and a power side assembly. A battery starts or activates a starter. The battery is connected to a direct current motor to start off or begin the engine function by activating a rear alternator. The rear alternator has three phases by using three hot lines, one neutral line, and one ground line. One hot line and the neutral are connected or will go to a transformer to bring the voltage to the correct voltage. From the transformer, the feed goes to an inverter, so the alternating current voltage is changed to a direct current voltage. This structure will feed the direct current motor for a continuous feed.

1 Claim, 4 Drawing Sheets

ELECTRIC VEHICLE

CROSS-REFERENCE TO RELATED APPLICATION

This application is a continuation of U.S. patent application Ser. No. 12/268,185, filed Nov. 10, 2012, now U.S. Pat. No. 8,387,728 issued Mar. 5, 2013.

This invention relates to an electric vehicle, and more particularly to an electric vehicle capable of good range and power with a quick recharging procedure.

BACKGROUND OF THE INVENTION

With the price of fossil fuel fluctuating wildly and tending to stay on the high or expensive side, new sources of energy become very desirable. Since such fossil fuel powers a lifestyle, vehicles and industry, it remains important. Much of that fossil fuel, and the raw materials to make the same, are produced by countries, which lack the dedication that the United States has to a representative government. In fact, at least some of those countries consider the United States to be an enemy.

To that end, it is very desirable to minimize dealings with those adversarial countries. Thus, it is critical to provide a replacement power source or sources in order to avoid those dealings. Many suggestions include the use of electric powered vehicles, in order to reduce such dependence. Typically, however, an electric powered vehicle lacks the range and desired speed commonly available in the fossil fuel vehicles.

Major problems exist with electric powered vehicles. Typical problems are range and power of the vehicles. Recharging the batteries, which power the vehicle is also a problem. Cooling and heating devices, as well as other accessories are also desired for the vehicle. Because of the large power consumption of these vehicle accessories, such accessories are not compatible with an electric powered vehicle. Nevertheless, those accessories can be critical to having the vehicle accepted by the general public.

SUMMARY OF THE INVENTION

Among the many objectives of the present invention is the provision of an electric circuit adapted for providing power for a vehicle, without the use of a fossil fuel-powered engine.

Another objective of the present invention is the provision of an electric circuit adapted for powering a vehicle for at least four hours.

Yet another objective of the present invention is the provision of an electric circuit adapted for powering a vehicle having an engine cooling feature.

Still, another objective of the present invention is the provision of an electric circuit adapted having a cooling feature for the passenger compartment.

These and other objectives of the invention (which other objectives become clear by consideration of the specification, claims and drawings as a whole) are met by providing an electric powered vehicle having a motor side assembly and a power side assembly. A battery will start or activate a starter, connected to a direct current motor to start off or begin the engine function by activating an rear alternator or generator. The rear alternator or generator, by being connected to the electric panel permits three phases come from the electric panel. From the electric panel with the rear alternator or generator or by using three hot lines, one neutral line, and one ground line connected to the panel. One hot line and the neutral line are connected or will go to a transformer to bring the voltage to the correct voltage. From the transformer, the feed goes to an inverter, so the alternating current voltage is changed to a direct current voltage. This structure will feed the direct current motor for a continuous feed.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
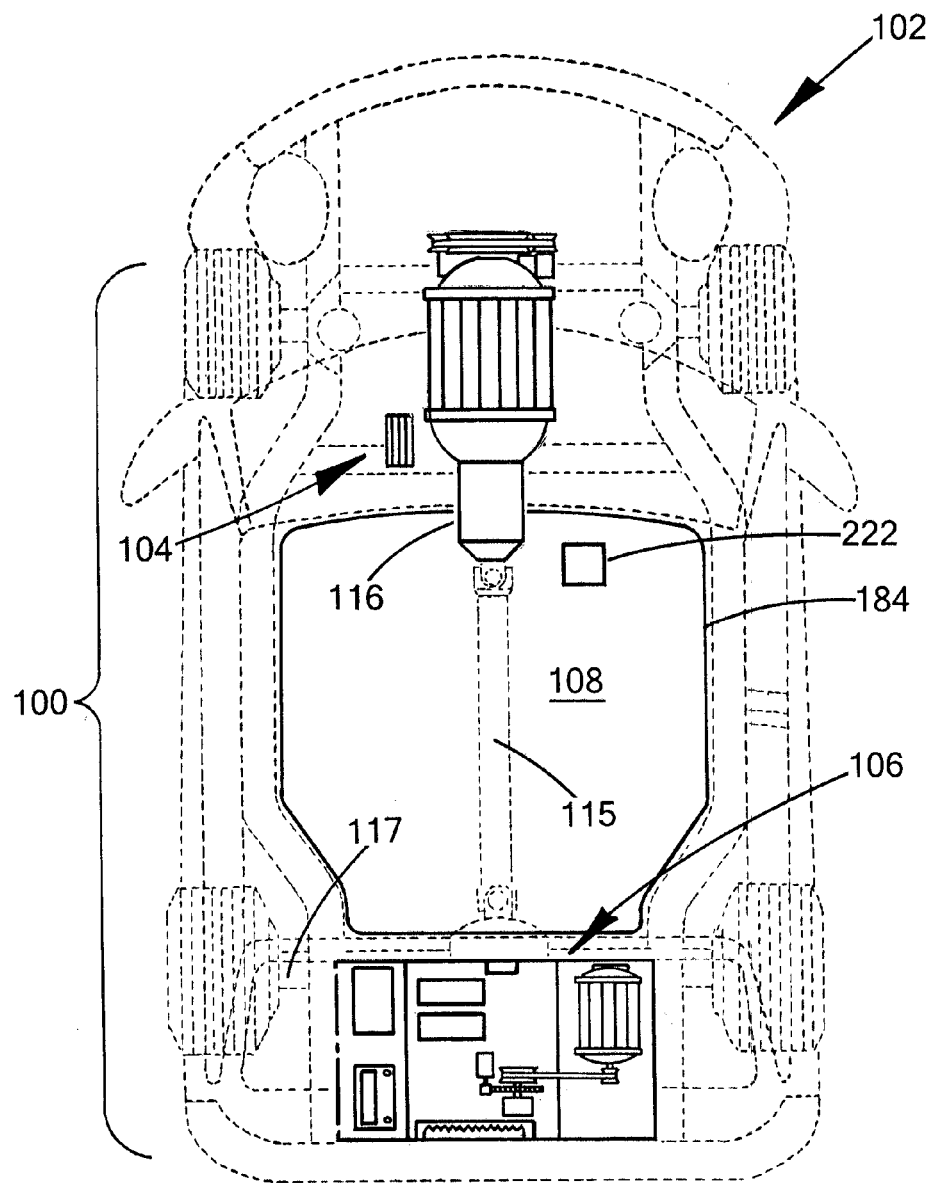
FIG. 1 depicts a diagram for the electric vehicle system 100 of this invention in use with a vehicle 102.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

To activate the electric power assembly for a vehicle the following steps are most efficient. The battery will start or activate the starter. The starter turns that the direct current motor to start off or begin the electric power assembly function. The direct current motor will activate or turn the rear alternator or generator. The rear alternator or generator has three phases by using three hot lines, one neutral line, and one ground line which feed electric panel 196. From the electric panel 196, one hot line and the neutral line are connected or will go to a transformer to bring the voltage to the correct voltage. From the transformer, the feed goes to an inverter, so the alternating current voltage is changed to a direct current voltage. This structure will feed the direct current motor for a continuous feed. The other two lines will feed the rheostat, which, in turn, feeds the motor side assembly. The motor side assembly will operate the vehicle as well as the two air conditioner compressors and the alternator. The alternator will power the internal electronics of the vehicle and at least partially recharge the battery.

Other devices may also additionally recharge the battery in any standard fashion. For example, a recharging procedure may use standard electrical power from a standard or special outlet at a home bus or other source. A solar recharging panel may also recharge the battery.

The rear alternator or generator, the transformer, the inverter, the direct-current motor, the starter, and the evaporator coil from the sub zero air-conditioning units are placed in a sealed box. The box is preferably of metal and is sealable. With the sealing, the box may have a vacuum or contain an inert gas. Inside that box, direct-current motor turns at 1,800 revolutions per minute, while with a fan belt and a two to one pulley ratio, the rear alternator or generator will provide adequate current at 3,600 revolutions per minute.

The vacuum in the metal box will keep water out of the unit and the evaporator coil from the subzero air-conditioning unit will keep the temperature of the power assembly down, so the direct current motor and the rear alternator or generator will not overheat. Both the direct current motor and the rear alternator or generator have counterweights equal to or greater than their own weight. Counterweights can keep the direct current motor and the rear alternator or generator moving when the sine waves of the direct current motor and the rear alternator or generator intersect. Without the counterweights, both the direct-current motor and the rear alternator or generator will slow down or stop.

With the direct-current motor and the rear alternator or generator each having a counterweight, it is preferred that the counterweight for each fit within the following parameters. The counterweight preferably ranges from substantially equal to the weight of the direct-current motor or the rear alternator or generator to about 2.5 times the weight thereof. More preferably, the counterweight preferably ranges from substantially equal to the weight of the direct-current motor or the rear alternator or generator to about 1.7 times the weight thereof. Most preferably, the counterweight preferably ranges from substantially equal to the weight of the direct-current motor or the rear alternator or generator to about 1.5 times the weight thereof.

There is also a rubber barrier, or other insulator, between the direct-current motor and the rear alternator or generator to counter the magnetic field each of them produces. The rubber barrier will have several small apertures therein in order to allow the cold air to radiate therethrough. At the rheostat, there will preferably be a limit switch, which is set at 900 revolutions per minute, so that the motor side assembly will run all the time that there is power to it from the power side assembly. A set of electric cables, which has one hotline and one neutral line, connects the alternator to the battery. This connection will allow the alternator keep going or providing power to the internal electronic devices and recharge the battery.

There are two air-conditioning units, which are turned by the motor, are critical. One provides comfort for the passengers by cooling the interior of the vehicle. The other air conditioner cools the rear alternator or generator in addition to the direct-current motor by using a sub-zero refrigerant.

The dual air-conditioning units and the alternator will rotate together with a pulley fan belt from the electric drive motor. For safety, there will be a shunt switch tied into the air bag system, which will shut down a rear alternator or generator if required. There is also a rubber lining, or other insulator, around the seating area for protection of the driver or passenger against any electrical discharge. This structure will permit the vehicle to be used and will run for at least four hours before having to be shut down in order to cool off before running again. After several shutdown periods, the battery may need to be recharged with standard house current or another source.

Figure 2:
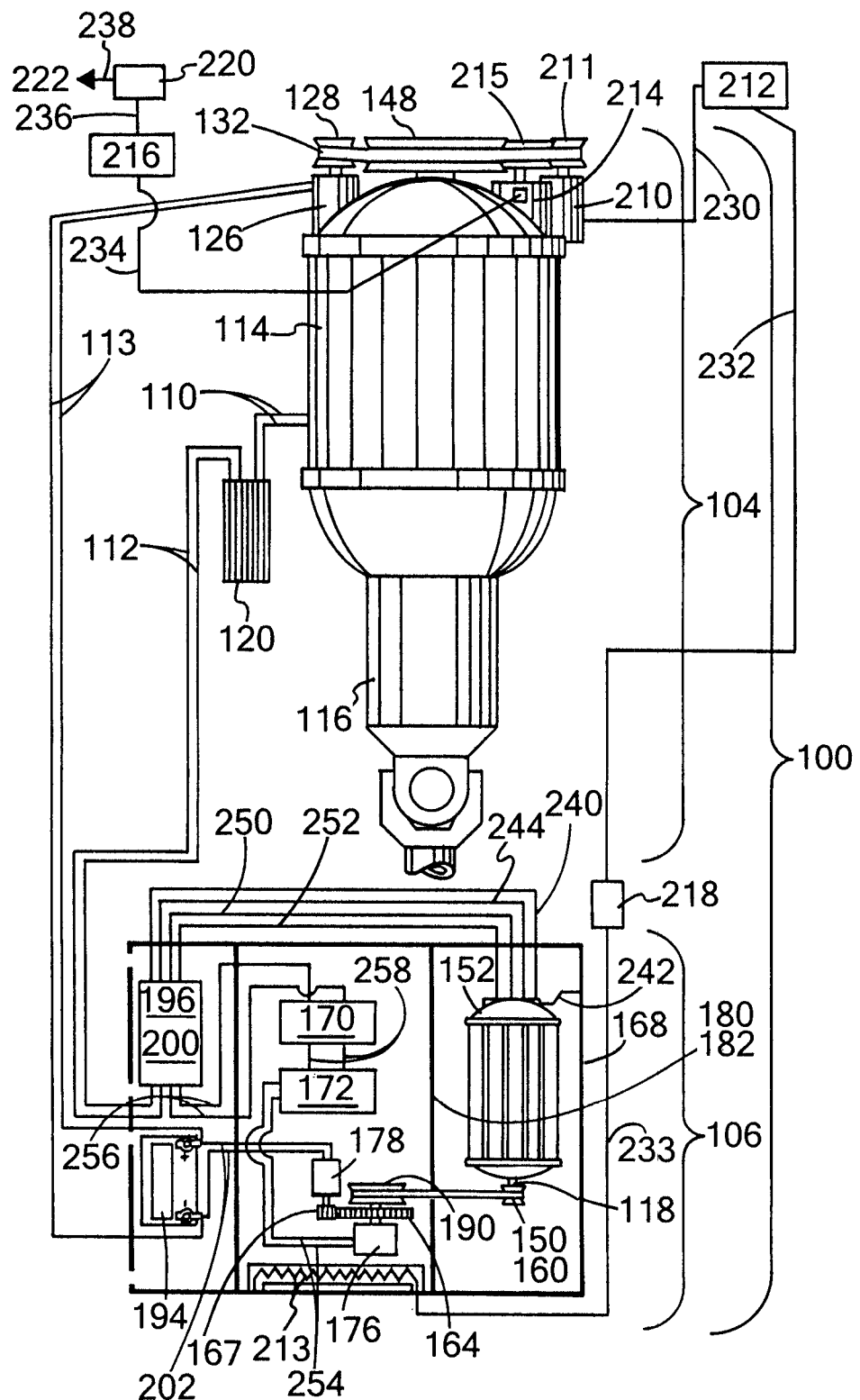
FIG. 2 depicts a circuit drawing for the electric vehicle system 100 of this invention.

Turning now to FIG. 1 and FIG. 2, electric vehicle system 100 is operably connected to a vehicle 102 which has passenger compartment 108. A motor side assembly 104 interconnects with the power side assembly 106 and provides motive power for the vehicle 102. The rheostat 120 interconnects between the motor side assembly 104 and power side assembly 106. The power side assembly 106 will power the motor side assembly 104.

There is also an insulator or apertured liner part barrier 180 between the direct current motor 176 and the rear alternator 152. Part barrier 180 will have several small apertures 182 therein in order to allow the cold air to radiate therethrough. Such cooling of between the direct current motor 176 and the rear alternator 152 permits electric vehicle system 100 to run more efficiently.

An occupant barrier 184, or insulator, protects any occupants of the vehicle 102 from any undesirable electrical activity. With this structure, the electric vehicle system 100 becomes more suited for use, because of improved safety.

Figure 3:
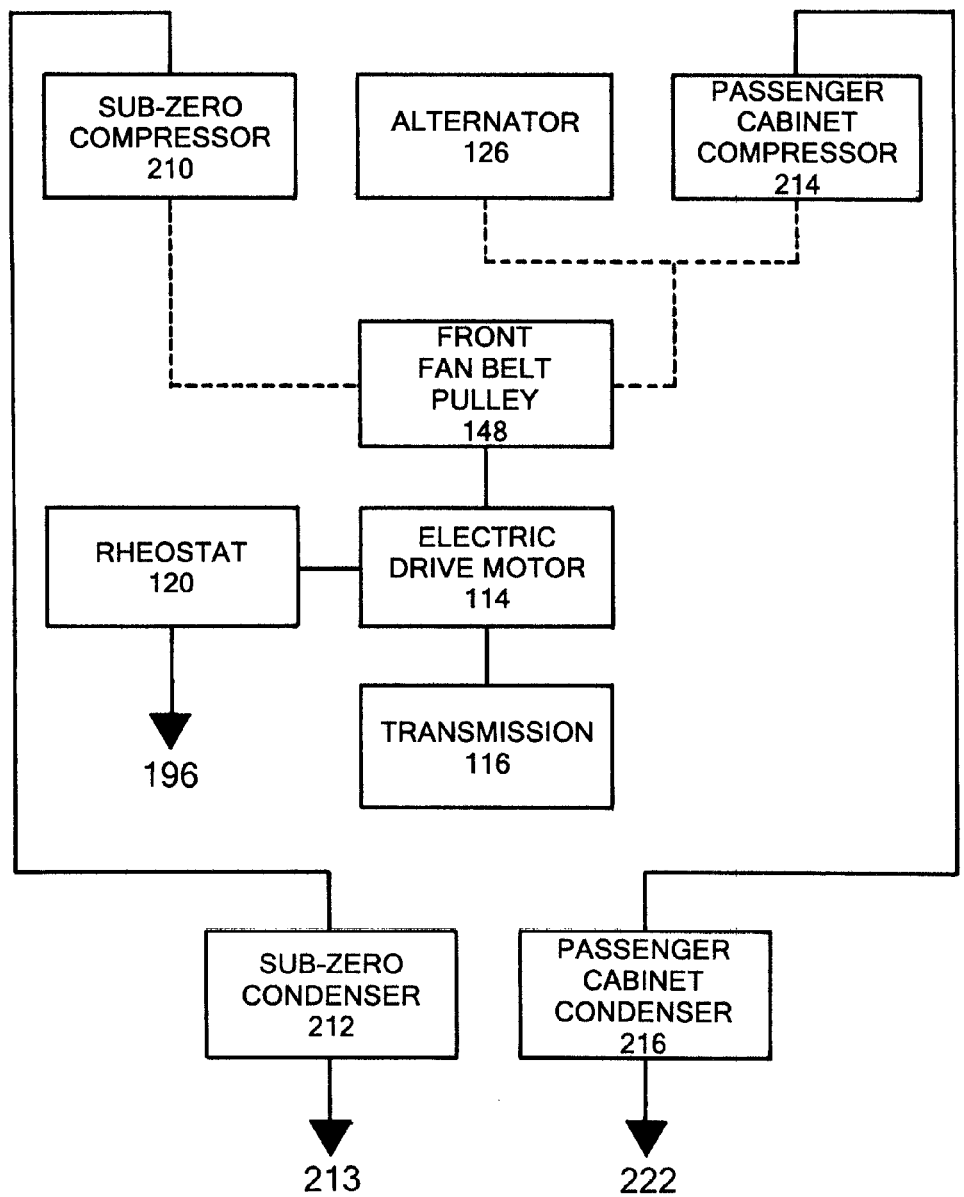
FIG. 3 depicts a block diagram for the electric vehicle system 100 of this invention from motor side assembly 104.
Figure 4:
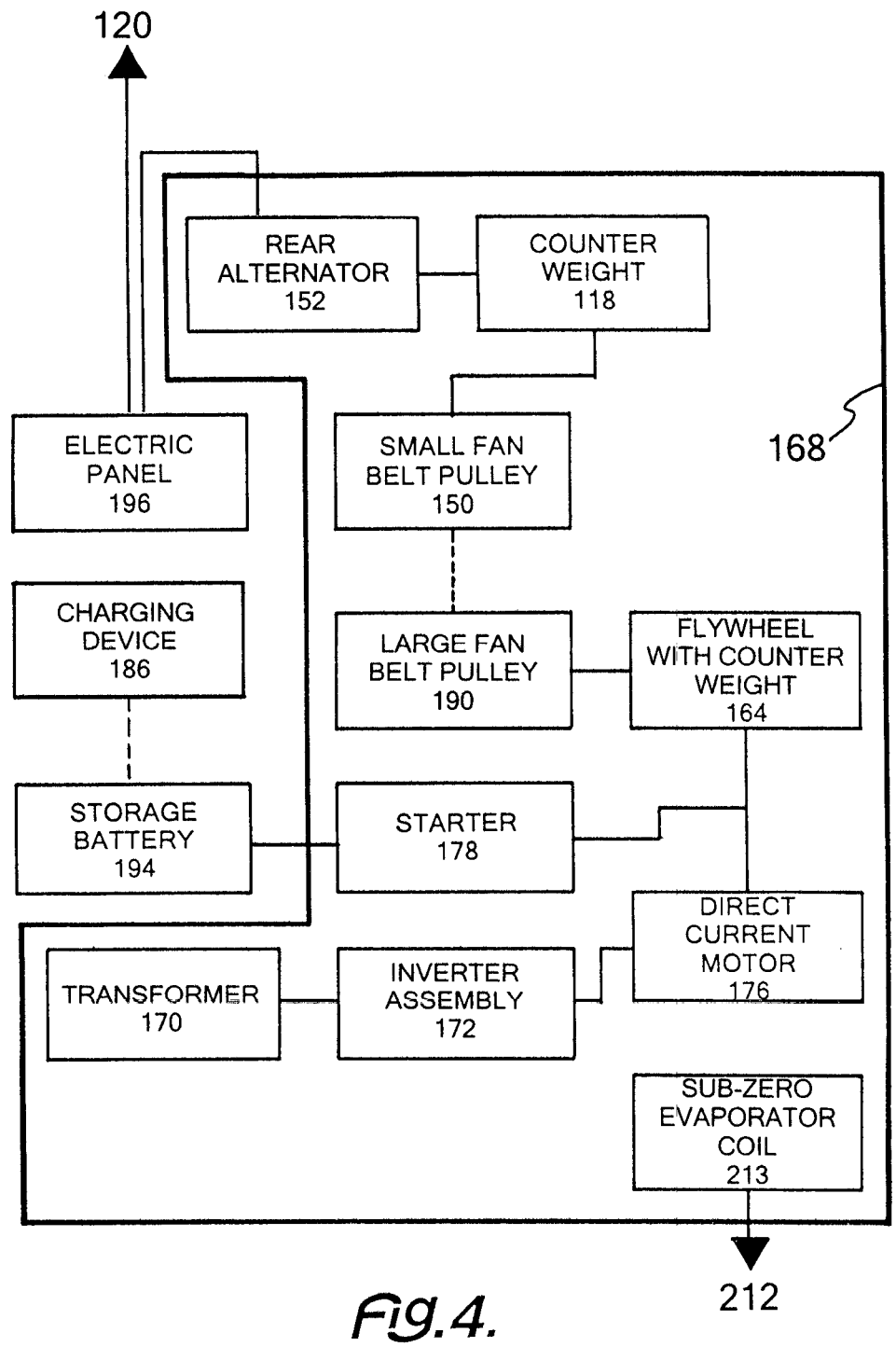
FIG. 4 depicts a block diagram for the electric vehicle system 100 of this invention from power side assembly 106.

Adding FIGS. 3 and 4 to the consideration, the function of electric vehicle system 100 becomes clear. Storage battery 194 utilizes stored direct current to engage starter 178 through battery to starter wires 202. Extending from starter 178 is starter pinion gear 167 which engages fly wheel with counterweight 164 which is located on direct current motor 176. The interaction between flywheel with counterweight 164 and starter pinion gear 167 engages direct current motor 176. Direct current motor 176 has large fan belt pulley 190 which cooperates with small fan belt pulley 150 through fan belt 160. Large fan belt pulley 190 has a diameter preferably twice that of small fan belt pulley 150. This interaction engages rear alternator 152 to produce alternating current.

Direct current motor 176 has the flywheel with counter weight 164 secured thereto. While rear alternator 152 has counterweights 118 secured thereto. Counterweights 118 and 164 keep the direct current motor 176 and the rear alternator 152 moving when the sine waves of the direct current motor 176 and the rear alternator 152 intersect. The direct current motor 176 turns at 1800 revolutions per minute. By using the small fan belt pulley 150 and large fan belt pulley 190, at a two to one diameter ratio, the direct current motor 176, by rotating at 1800 revolutions per minute, will turn the rear alternator 152 at 3,600 revolutions per minute. The power is provided for the electric vehicle system 100.

Rear alternator 152 has three phases and runs alternating current through first, second, and third hot lines (244, 250, 252), one ground line 242, and one neutral line 240 to the electric panel 196. From electric panel 196 alternating current runs to the transformer 170. Electric panel to transformer wires 256, which have first hotline 244 and a neutral line 240, connect the electric panel 196 to the transformer 170. Transformer 170 provides a power conversion by adjusting the voltage to the correct voltage and is connected to the inverter assembly 172. Transformer to inverter wires 258, which have the first hot line 244 and a neutral line 240, connect the transformer 170 to the inverter assembly 172. The inverter assembly 172 converts the electric power from alternating current to direct current. From inverter assembly 172 runs direct current to the direct current motor 176. Inverter to direct current motor wire 254, which has first hot line 244 and neutral line 240, connects the inverter assembly 172 to the direct current motor 176. The continuing supply of direct current feeds direct current motor 176 and the process continues.

Rear alternator 152 has different embodiments. Rear alternator can have an internal inverter. Thus, rear alternator with internal inverter produces direct current. The power side assembly 106 functions in the same manner as with rear alternator 152 with the exception that inverter assembly 172 is eliminated.

Moreover, another embodiment of rear alternator 152 is a direct current generator. Direct current generator produces direct current. The power side assembly 106 functions in the same manner as with rear alternator 152 with the exception that inverter assembly 172 is eliminated.

A further optional, but preferred embodiment, is placing a shunt switch 200 into electric panel 196. The shunt switch is wired in a standard fashion and is positionable to a standard vehicle air bag system (not shown), or can be positioned as desired at the front or the rear of the vehicle, full perimeter. As many shunt switches as necessary can be positioned around the perimeter of the vehicle as desired for safety. The shunt switch 200 will operate to stop rear alternator 152 if the air bag deploys. This is a highly preferred safety option as the stopping of the vehicle will be facilitated as well as the electricity flow being stopped.

Moreover, from the electric panel 196 alternating current runs through a second set of electric cables 112, containing second hot line 250 and third hot line 252, to the rheostat 120 which feeds the motor side assembly 104 from power side assembly 106. From the rheostat 120 alternating current runs through a first set of electric cables 110, containing second hot line 250 and third hot line 252, to the electric drive motor 114. The rheostat serves the function of an accelerator in the vehicle 102.

The transmission 116 is connected to the electric drive motor 114. Electric drive motor 114 powers transmission 116. Then, the transmission 116 powers drive shaft 115. The drive shaft 115 then is configured to power the axle 117, which may be a front axle or rear axle. Thus, this structure may provide for a front wheel drive, rear wheel drive, four wheel drive, or all wheel drive car.

Electric drive motor 114 has front fan belt pulley 148 mounted thereon. The drive motor pulley belt 132 cooperates to connect and operate front fan belt pulley 148, alternator pulley 128, sub-zero compressor pulley 211, and passenger cabinet compressor pulley 215. Alternator pulley 128 receives the motion of the drive motor pulley belt 132 and turns or drives the alternator) 26. Alternator 126 produces alternating current and has a converter to change the alternating current to direct current. The direct current runs through a third set of electric cables 113 to storage battery 194. This process allows a continuous recharge of storage battery 194 while electric vehicle 102 is running. Also, the alternator 126 will power the internal electronics of the vehicle 102.

The rear alternator 152, the transformer 170, the inverter assembly 172, the direct current motor 176, the starter 178, and the sub-zero evaporator coil 213 are preferably placed in a vacuum metal box 168. Storage battery 194 is mounted on the outside of metal case of vacuum metal box 168, which encloses power side assembly 106. Also mounted on the outside of metal case of vacuum metal box 168 is electric panel 196 for vehicle 102.

Sub-zero compressor pulley 211 receives the motion of the drive motor pulley belt 132 and turns or drives the sub-zero compressor 210. Sub-zero compressor 210 has a first copper tube 230 connecting it to sub-zero condenser 212. Then, a second copper tube 232, runs from sub-zero condenser 212 to the sub-zero pressure valve 218. The sub-zero pressure valve 218 changes the coolant from high pressure to low pressure. A third copper tube 233 runs from the sub-zero pressure valve 218 to the sub-zero evaporator coil 213. This process cools the interior of the vacuum metal box 168, and the components inside the box, to minus 18 degrees Celsius (0 degrees Fahrenheit).

This structure for electric vehicle system 100 and vehicle 102 provides for an efficient, easily recharged electric vehicle 102. In this manner electric vehicle system 100 powers vehicle 102 for up to four hours. By stopping before four hours the motor side assembly 104 and the power side assembly 106 will be allowed to cool. Not every cooling down period requires recharging before continuing the use of the vehicle battery. So electric vehicle system 100 does not have to be recharged after every four hours of use, just possibly cooled. Further travel can then occur.

Passenger cabinet compressor pulley 215 receives the motion of the drive motor pulley belt 132 and turns or drives the passenger cabinet compressor 214. Fourth copper tube 234 joins passenger cabinet compressor 214 to passenger cabinet condenser 216. Fifth copper tube 236 joins passenger cabinet condenser 216 to passenger cabinet pressure valve 220. Sixth copper tube 238 joins passenger cabinet pressure valve 220 to passenger cabinet evaporator coil 222. This system cools passenger compartment of vehicle 102.

Referring specifically to FIG. 4, charging device 186 can also recharge battery 194. Charging device 186 can be any suitable supplier of direct current. For example, typical charging devices connect to standard electric current; whether from a home, a business, or a public source; and then to the battery 194. Also, battery 194 may be connected to a solar powered charging device, which may travel with the vehicle 102 at all times, or may be made available at appropriate points. If the solar charging device of charging device 186 travels with the vehicle 102, it may be permanently or removably attached to battery 194.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this invention can become clear to a person having ordinary skill in this particular art. Such modifications are clearly covered by this disclosure.

What is claimed and sought to be protected by Letters Patent is:

1. A vehicle system connectable to a vehicle comprising;
    a motor side assembly interconnected with a power side assembly to provide motive power for the vehicle;
    a rheostat interconnecting the motor side assembly and the power side assembly;
    a direct current motor and a rear alternator being positioned within the power side assembly;
    the motor side assembly including a transmission connected to an electric drive motor;
    the direct current motor having a first counterweight mounted thereon;
    the rear alternator having a second counterweight mounted thereon;
    the first counterweight mounted and the second counterweight mounted delaying a slowing down the electric powered vehicle;
    a pulley ratio supporting the vehicle system;
    the direct current motor having a pulley ratio of two to one relative to the direct current motor;
    the transmission being connected to the electric drive motor;
    a first set of electric cables connecting the rheostat to the electric drive motor;
    a second set of electric cables connecting the power side assembly to the rheostat;
    the direct current motor having a motor pulley twice the diameter of a rear alternator pulley on the rear alternator in order to provide power to the electric vehicle system;
    a fan belt cooperating to connect and operate the rear alternator pulley, a sub-zero compressor, an alternator, and a passenger cabinet compressor;

a sub-zero air conditioner having the sub-zero compressor and a sub-zero condenser;
a first copper tube connecting the sub-zero compressor to the sub-zero condenser; and
a second copper tube and a third copper tube connecting the sub-zero condenser to the power side assembly in order to cool that part of the vehicle.

\* \* \* \* \*